(12) United States Patent
Jachalsky et al.

(10) Patent No.: US 9,142,026 B2
(45) Date of Patent: Sep. 22, 2015

(54) CONFIDENCE MAP, METHOD FOR GENERATING THE SAME AND METHOD FOR REFINING A DISPARITY MAP

(75) Inventors: Jörn Jachalsky, Hannover (DE); Markus Schlosser, Hannover (DE); Dirk Gandolph, Ronnenberg (DE)

(73) Assignee: THOMSON LICENSING, Issy les Moulineaux (FR)

( * ) Notice: Subject to any disclaimer, the term of this patent is extended or adjusted under 35 U.S.C. 154(b) by 263 days.

(21) Appl. No.: 13/579,602

(22) PCT Filed: Feb. 16, 2011

(86) PCT No.: PCT/EP2011/052281
§ 371 (c)(1),
(2), (4) Date: Aug. 17, 2012

(87) PCT Pub. No.: WO2011/104151
PCT Pub. Date: Sep. 1, 2011

(65) Prior Publication Data
US 2012/0321172 A1    Dec. 20, 2012

(30) Foreign Application Priority Data
Feb. 26, 2010    (EP) .................................... 10305193

(51) Int. Cl.
*G06K 9/00* (2006.01)
*G06T 7/00* (2006.01)

(52) U.S. Cl.
CPC ..... *G06T 7/0075* (2013.01); *G06T 2207/10021* (2013.01); *G06T 2207/20028* (2013.01)

(58) Field of Classification Search
None
See application file for complete search history.

(56) References Cited

U.S. PATENT DOCUMENTS

2013/0064443 A1*    3/2013    Schlosser et al. ............. 382/154

FOREIGN PATENT DOCUMENTS

| CN | 101605270 | 12/2009 |
|---|---|---|
| EP | 2157803 | 2/2010 |
| WO | WO0027131 | 5/2000 |
| WO | WO2008038205 | 4/2008 |

OTHER PUBLICATIONS

Steffens et al. "Probabilistic Scene Analysis for Robust Stereo Correspondence," in the file wrapper and referenced in the International Search Report.*
Wang et al. "Search Space Reduction for MRF Stereo," in the file wrapper and referenced in the International Search Report.*
(Continued)

*Primary Examiner* — Vu Le
*Assistant Examiner* — Alexander J Lesnick
(74) *Attorney, Agent, or Firm* — Tutunjian & Bitetto, P.C.

(57) ABSTRACT

A method for generating a confidence map comprising a plurality of confidence values, each being assigned to a respective disparity value in a disparity map assigned to at least two stereo images each having a plurality of pixels, wherein a single confidence value is determined for each disparity value, and wherein for determination of the confidence value at least a first confidence value based on a match quality between a pixel or a group of pixels in the first stereo image and a corresponding pixel or a corresponding group of pixels in the second stereo image and a second confidence value based on a consistency of the corresponding disparity estimates is taken into account.

10 Claims, 5 Drawing Sheets

(56) References Cited

OTHER PUBLICATIONS

Banks et al. "Evaluation of New and Existing Confidence Measures for Stereo Matching," published in 1998.*
Wang et al., "Search Space Reduction for MRF Stereo," Computer Vision (Lecture notes in Computer Science), Springer, Berlin, Germany, Oct. 12, 2008, pp. 576-588.
Steffens et al., "Probabilistic Scene Analysis for Robust Stereo Correspondence," Image Analysis and Recognition, Springer, Berlin, Germany, Jul. 6, 2009, pp. 697-706.
Mattoccia et al., "Accurate and Efficient Cost Aggregation Strategy for Stereo Correspondence Based on Approximated Joint Bilateral Filtering," Computer Vision, Springer, Berlin, Germany, Sep. 23, 2009, pp. 371-380.
Search Report Dated May 24, 2011.
Ogale et al., "Shape and the Stereo Correspondence Problem", International Journal of Computer Vision, Dec. 2005, vol. 65, No. 3, pp. 147-162.
Sun et al., "Symmetric Stereo Matching for Occlusion Handling", IEEE Computer Society Conference on Computer Vision and Pattern Recognition CVPR 2005, Jun. 20, 2005, vol. 2, pp. 399-406.
Xu et al., "Stereo Matching: An Outlier Confidence Approach", 10th European Conference on Computer Vision, Marseille, France, Oct. 12, 2008, pp. 775-787.
Yang et al., "Stereo Matching with Color-Weighted Correlation, Hierarchical Belief Propagation, and Occlusion Handling", IEEE Transactions on Pattern Analysis and Machine Intelligence, Mar. 2009, vol. 31, No. 3, pp. 492-504.
Yoon et al., "Joint Estimation of Shape and Reflectance using Multiple Images with Known Illumination Conditions", International Journal of Computer Vision, Jan. 2010, vol. 86, No. 2-3, pp. 192-210.
Jachalsky et al., "Reliability-aware cross multilateral filtering for robust disparity map refinement", 3DTV-Conference: The True Vision—Capture, Transmission and Display of 3D Video (3DTV-CON), Jun. 7, 2010, pp. 1-4.
Brown et al., "Advances in computational stereo", IEEE Transactions on Pattern Analysis and Machine Intelligence, vol. 25, No. 8, Aug. 4, 2003, pp. 993-1008.
Tomasi et al., "Bilateral filtering for gray and color images", Sixth International Conference on Computer Vision, Jan. 4, 1998, pp. 839-846.
Eisemann et al., "Flash photography enhancement via intrinsic relighting", Journal ACM Transactions on Graphics (TOG)—Proceedings of ACM SIGGRAPH 2004 TOG, vol. 23 No. 3, Aug. 2004, pp. 673-678.
Petschnigg et al., "Digital photography with flash and no-flash image pairs", ACM Transactions on Graphics (TOG)—Proceedings of ACM SIGGRAPH 2004, vol. 23, No. 3, Aug. 2004, pp. 1-9.
Huang et al., "3D image reconstruction and application for micro-manipulation systems", Proceedings of 2004 IEEE/RSJ International Conference on Intelligent Robots and Systems, Sendai, Japan, Sep. 28, 2004, pp. 4032-4037.
Murino et al., "Disparity map restoration by integration of confidence in Markov random fields models", 2001 International Conference on Image Processing, Oct. 7, 2001, vol. 2, pp. 29-32.
Rebuffel et al., "Estimation of depth-from-motion combining iterative prediction scheme and regularization framework", Proceedings of the 13th International Conference on Pattern Recognition, Aug. 25, 1996, vol. 1, pp. 466-470.
Boughorbel, F., "Adaptive filters for depth from stereo and occlusion detection", Proceedings of SPIE-IS&T, Stereoscopic Displays and Applications XIX, vol. 68030, Feb. 29, 2008, pp. 1-10.

* cited by examiner

CONFIDENCE MAP, METHOD FOR GENERATING THE SAME AND METHOD FOR REFINING A DISPARITY MAP

This application claims the benefit, under 35 U.S.C. §365 of International Application PCT/EP2011/052281, filed Feb. 16, 2011, which was published in accordance with PCT Article 21(2) on Sep. 1, 2011 in English and which claims the benefit of European patent application No 10305193.4, filed Feb. 26, 2010.

FIELD OF THE INVENTION

The invention relates to a confidence map, a method for generating a confidence map and further to a method for refining a disparity map using a confidence map that is assigned to the disparity map.

BACKGROUND

For stereoscopic display in 3D-TV, 3D-video and 3D-cinema, a real word scene is captured by two or even more cameras. In most of the practical cases, a scene is captured from two different viewpoints using a stereo camera equipment. An exemplary object in a real word scenario is projected onto different positions within the corresponding camera images. If the parameters for the stereo camera setup are known and the displacement between corresponding points in the stereo images belonging to one and the same object in the real word can be determined, the distance between the real world object and the camera, i.e. the depth of the object, may be calculated by triangulation. The displacement between corresponding points in the stereo images is commonly referred to as disparity, and the task of finding point correspondence between the two input or basic images is typically called stereo matching. The real world 3D-structure of the captured scene can be reconstructed from the disparities.

The disparity information is usually integrated into a disparity map containing the results of the matching calculations. However, the performance of the matching process inherently depends on the underlying image content of the basic images. In an ideal situation, the basic images are captured by two pinhole cameras showing no lens distortion and no color difference, which is however not realistic. By using calibration and rectification this situation may be approximated when taking conventional cameras for capturing the scene. But even for ideal conditions there still remain several problems in the matching process due to e.g. occluded areas in one of the input pictures, perspective deformations, specular reflections, depth discontinuities or missing texture in some of the objects or the background that make the matching process a challenging task.

A further obstacle for stereo matching is the fact that many surfaces of real world objects may not assumed to be truly Lambertian reflectors and specular reflections typically look different from different viewing angles. Another problem is that at object borders the neighborhood area comprises two different, conflicting depth values, and accordingly the matching process is in conflict which depth it has to assign to the respective point in the surrounding area. Other problems for the matching process result from either a lack of sufficient texture in the object's surface or from quasi periodic texture.

Consequently, for some parts of a basic image it is inherently more difficult to determine accurate disparity values, also referred to as disparity estimates, than for others. Moreover, for occluded regions it is only possible to extrapolate the depth information from their surroundings. Occlusions result from the different viewpoints of the cameras so that for some areas in the basic stereo pictures it is always impossible to find a point-to-point correspondence.

The aforementioned problems during disparity estimation lead to varying levels of accuracy and reliability for the disparity values. However, the requirements of applications differ with regard to density, accuracy and reliability of the depth values in the disparity maps. Some applications, e.g. multi-view interpolation for multi-view displays or user-adjustable depth require dense disparity maps, while other applications require only few but highly reliable disparity estimates. This is, for example, the case for stereoscopic positioning of text and graphics for 3D-menus or 3D-subtitles. Multi-view coding as a further application has requirements that are in-between those of multi-view interpolation and stereoscopic positioning, as an exact estimate may be less important than an accurate labeling of occlusions.

Apart from these differences, the level of reliability of the depth information plays an important role. Confidence information can be helpful in subsequent steps of the 3D processing chain, especially for refinement steps aiming to improve the quality of the disparity estimates.

A first approach to a confidence measure is the similarity function employed during the stereo matching. In global optimization schemes, a cost function typically comprises a data term for the similarity and an outlier term for consistency information. An additional smoothness term fosters the piece-wise smoothness of the disparity map by enforcing that depth discontinuities may only occur at color edges.

In most cases, the outlier term is a simple binary variable and all pixels that do not meet the left-right consistency are marked as unreliable. A further approach is done by L. Xu and J. Jia.: "*Stereo Matching: An Outlier Confidence Approach*", European Conference on Computer Vision (ECCV) (2008), pp. 775-787, introducing a soft outlier estimate that is assigned to a respective pixel according to their matching cost if they pass the consistency test. A similar approach was done by Q. Yang et al.: "*Stereo Matching with Color-Weighted Correlation, Hierarchical Belief Propagation and Occlusion Handling*", IEEE Trans. Pattern Anal. Mach. Intell. Vol. 31 (2009), pp. 492-504, wherein a continuous confidence value is determined by evaluating the uniqueness of the similarity function in terms of the ratio between the first and the second best match.

The quality of a disparity map may be improved by a refining process. Typically, bilateral filters are employed for refining a disparity map. These filters are edge-preserving smoothing filters that employ a domain/spatial filter kernel and a range filter kernel, as exemplarily disclosed by C. Tomasi and R. Manduchi: "*Bilateral Filtering for Gray and Color Images*", Sixth International Conference on Computer Vision (1998), pp. 839-846. Typically, the spatial filter kernel evaluates spatial distances, while the range filter kernel evaluates color or intensity differences.

SUMMARY

It is an object of the invention to provide a confidence map, a method for generating a confidence map and a method for refining a disparity map that are improved with respect to the deficiencies in the art.

In one aspect of the invention a method for generating a confidence map comprising a plurality of confidence values, each being assigned to a respective disparity value in a disparity map is provided. The disparity map is assigned to at least two stereo images each having a plurality of pixels. A confidence value is determined for each disparity value by taking into account information about at least a match quality between a pixel or a group of pixels in the first stereo image and a corresponding pixel or a corresponding group of pixels in the second stereo image and information about a consistency of the corresponding disparity estimates.

For determination of the confidence value at least a first confidence value is based on a match quality between a pixel or a group of pixels in the first stereo image and a corresponding pixel or a corresponding group of pixels in the second stereo image. A second confidence value is based on a consistency of the corresponding disparity estimates.

The match quality may be determined by using a stereo matcher applying a normalized cross-correlation as a similarity measure. Preferably, the intensity images are taken as a basis in order to provide a stereo matching process that is robust against brightness and color variations.

The consistency of the disparity estimates, also referred to as the uniqueness constraint, is preferably verified by calculating the left-right consistency. It is checked if a corresponding point in a first picture of a stereoscopic pair of pictures refers back to the original point in the second picture. The potentially remaining distance between the back reference and the original point is a measure for the inconsistency. The strength of the left right consistency check stems from the fact that it combines independent information from the left-to-right and right-to-left estimation processes.

Advantageously, one single unified confidence map having one normalized confidence value per pixel reflecting the reliability of disparity values/depth estimates is provided. There is no need to fulfill any special form as it is usually required by global optimization schemes. Arbitrary integration rules between the values for the match quality and the uniqueness may be employed for the generation of the confidence map, e.g. addition/multiplication, minimum/maximum, etc. Further, arbitrary mappings between the measured entity and a confidence estimate like e.g. any non-linear function, upper/lower limit, etc. is possible. Advantageously, local or global constraints may be integrated into the generation of the confidence values.

According to another aspect of the invention the consistency is determined by performing a pixel-based left-right consistency check.

Advantageously, the match-quality values are re-normalized. Preferably, the values for the match-quality lie in the interval [0,1]. The distribution of the match-quality may approximately be described as falling off exponentially from a maximum at one. For textured regions, the achieved values are typically very close to one with only little deviations. For almost homogeneous regions, the mean value of the match-quality is significantly smaller. However, as the standard deviation is dramatically increased, the correlation coefficient nevertheless reaches rather high matching values for many pixels. Consequently, even small deviations from the value should be considered a rather strong indication for unreliable estimates. Therefore, the distribution of the match quality is heavily flattened in a re-normalization similar to a kind of histogram equalization.

According to another aspect, for determination of the second confidence value, information about a visibility of the respective pixel is taken into account. Visibility is less strict in comparison to uniqueness. The strict one-to-one mapping of the uniqueness constraint is relaxed. A pixel is still treated as visible if a matching pixel can be found. The visibility constraint relaxes the one-to-one mapping of the uniqueness constraint to a safer many-to-one mapping. Visibility simply requires that an occluded pixel has no match in the other image and a non-occluded pixel has at least one match. It is less restrictive and thus less powerful compared to uniqueness, but it allows an explicit detection of occlusions. The left-right consistency check merely indicates outliers without giving any reason for their unreliability.

Advantageously, the uniqueness constraint and the visibility constraint are combined. The strength of the uniqueness constraint is due to the fact that it combines independent information from the left-to-right and right-to-left estimation process. The visibility constraint relaxes this one-to-one mapping to a safer many-to-one mapping. It simply requires that an occluded pixel has no match in the other image and a non-occluded pixel has at least one match. In such a case, uniqueness would indicate false estimates without giving any reason for their unreliability. By jointly exploiting both constraints, their strengths can be combined while avoiding their weaknesses.

According to an aspect of the invention the second confidence value assumes discrete values of confidence and in an advantageous aspect of the invention, the discrete confidence values are selected from a group of: RELIABLE, UNRELIABLE, OCCLUDED and UNDECIDED.

The confidence value RELIABLE is assigned to pixels having a left-right consistency of zero or invisible pixels having a left-right consistency of one. Pixels having a left-right consistency of zero are the most consistent matches, which implies that the pixels are also visible. According to an aspect of the invention, pixels having a left-right consistency equal to one, but which are indicated as being invisible, are also given the confidence status RELIABLE. In an empirical analysis, it was determined that these pixels typically form a small part in the respective picture, generally a line having a width of only one pixel. Typically, such areas have a left-right consistency that is comparably low because it is very likely violated by sampling issues only. Consequently, these pixels may still be treated as to be consistent, i.e. they are assigned to the confidence value RELIABLE.

The confidence value UNRELIABLE is assigned to visible pixels having a left-right consistency greater than two. Preferably, the confidence value UNRELIABLE is assigned to pixels having a left-right consistency of greater than four. These pixels simply failed in the matching process e.g. due to insufficient texture in a respective area. The left-right consistency is almost uniformly distributed for values greater than one. It is a question of safety that pixels having a left right consistency smaller or equal to two are classified as UNDECIDED.

The confidence value OCCLUDED is assigned to invisible pixels having a left-right consistency greater than two. Pixels in occluded areas are almost entirely marked as invisible and have a large inconsistency. In contrast to the aforementioned unreliable pixels, the classification of occluded pixels is difficult, because they often stem from areas that are visible and merely lack texture.

Finally, the confidence value UNDECIDED is assigned to visible pixels having a left-right consistency equal to one or pixels having a left-right consistency equal to two. UNDECIDED is a rejection class for pixels for which it is not completely clear if they should receive the same amount of penalty as an UNRELIABLE-classified pixel.

According to an advantageous aspect of the invention, the confidence value is determined by further taking into account information about a confidence value of further pixels that are located in a surrounding area of the respective pixel. Such neighborhood relationships are advantageously taken into account because a reliable pixel that is surrounded by many other reliable pixels is likely to be more reliable than a pixel at the edge of a reliable region.

In another aspect of the invention, a confidence map comprising a plurality of confidence values each being assigned to a respective disparity value in a disparity map is provided. The disparity map is generated for at least two stereo images, each having a plurality of pixels. The confidence value is based on at least a first confidence value based on a match quality between a pixel in the first stereo image and a corresponding pixel in the second stereo image. A second confidence value is based on a consistency of the corresponding disparity estimates.

Same or similar advantages already mentioned for the method according to the invention apply to the confidence map according to the invention.

In another aspect of the invention a method for refining a disparity map that is assigned a confidence map according to the invention is provided. To determine a refined disparity value for a pixel of interest, the method comprises the steps of:
- applying a domain filter kernel on the pixel of interest and a pixel that is located in a surrounding area of the pixel of interest,
- applying a range filter kernel on the pixel of interest and a pixel that is located in a surrounding area of the pixel of interest, and
- weighting a result of the application of the domain and the range filter kernel by a confidence value for the pixel in the surrounding area, wherein the confidence value is take from the associated confidence map Preferably, the step of applying the domain filter kernel comprises determining a spatial distance between the pixel in the surrounding area and the pixel of interest. Furthermore, the step of applying the range filter kernel comprises determining a color or intensity difference between the pixel in the surrounding area and the pixel of interest. Finally, the step of weighting the result comprises determining a product of the result of the domain filter kernel, a result of the range filter kernel and the confidence value for the pixel in the surrounding area, wherein the confidence value is take from the associated confidence map.

Advantageously, the method for refining a confidence map uses a cross-multilateral filter that is guided by the confidence map according to the invention. In a refinement stage, alignment of the disparity estimates to the object borders is improved. This results in a better object segmentation. Further, the disparity map is smoothed and unwanted outliers are reduced. Moreover, information of the reliable regions of is spread over regions with similar color/intensity. This helps to fill holes in the disparity map which is advantageous if a dens disparity map is needed.

BRIEF DESCRIPTION OF DRAWINGS

Further objects of the invention will ensue from the following description of an embodiment of the invention with reference to the accompanying drawings, wherein.

DETAILED DESCRIPTION OF AN EXEMPLARY EMBODIMENT

Figure 1:
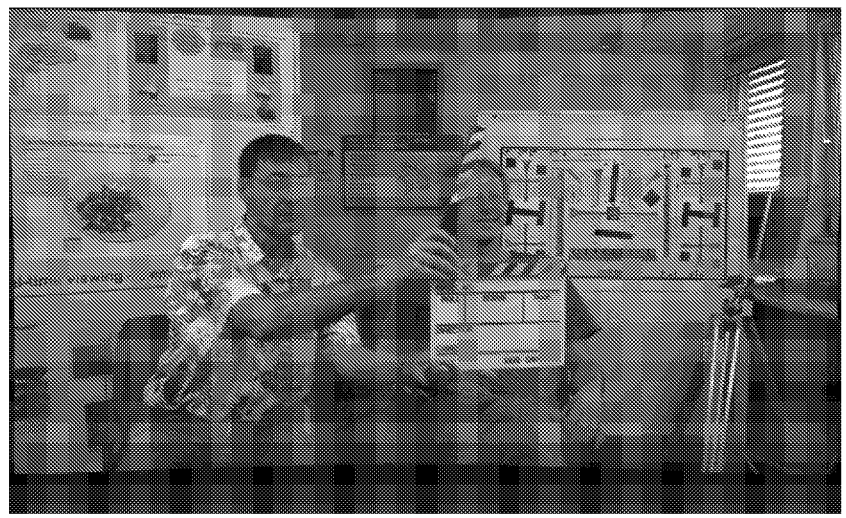
FIG. 1 shows a left input image.
Figure 2:
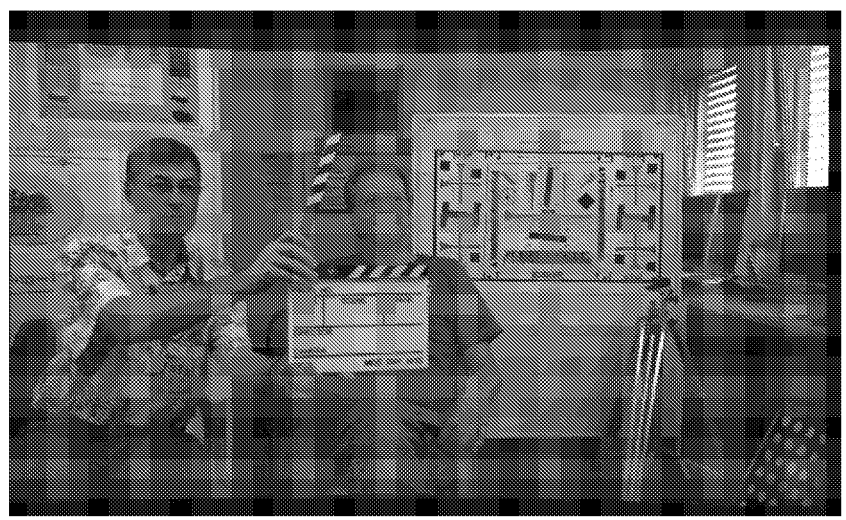
FIG. 2 shows a right input image.
Figure 3:
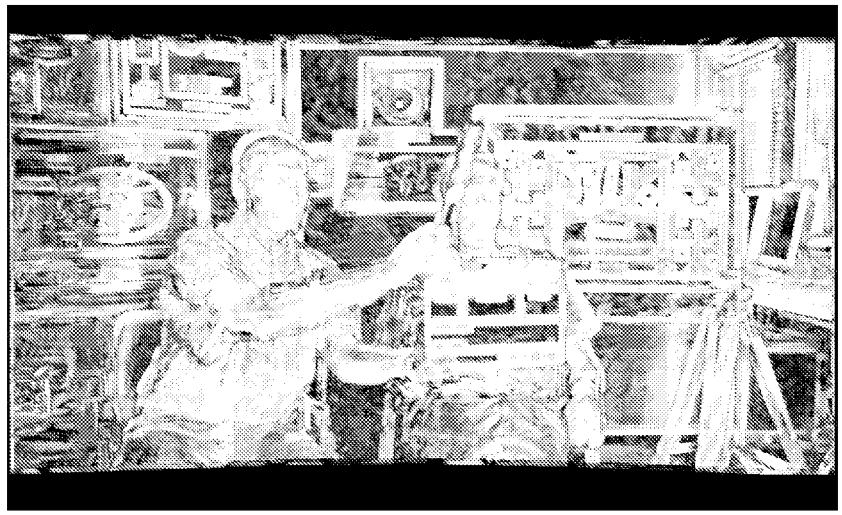
FIG. 3 depicts a map showing a matching quality between the left and right input picture.

FIG. 1 is an exemplary left view, FIG. 2 is the corresponding right view of a stereoscopic pair of pictures. In a first approach, a matching quality is taken as a measure for the confidence of the disparity values of the respective pixels of a corresponding disparity map. FIG. 3 shows the matching quality for the pictures in FIGS. 1 and 2. Preferably, a normalized cross-correlation is used as similarity measure on the intensity images and per definition, its values lie in the interval [0;1]. As indicated by the overall brightness of FIG. 3, the distribution of the matching quality may approximately be described as falling off exponentially from a maximum at one. For textured regions, the achieved matching values are typically very close to one with little deviations only. For the almost homogeneous regions in the background, the mean value of the matching quality is significantly lower. However, the matching quality nevertheless reaches rather high values for many pixels. Consequently, even small deviations from the value one shall be considered a rather strong indication for unreliable estimates.

Figure 4:
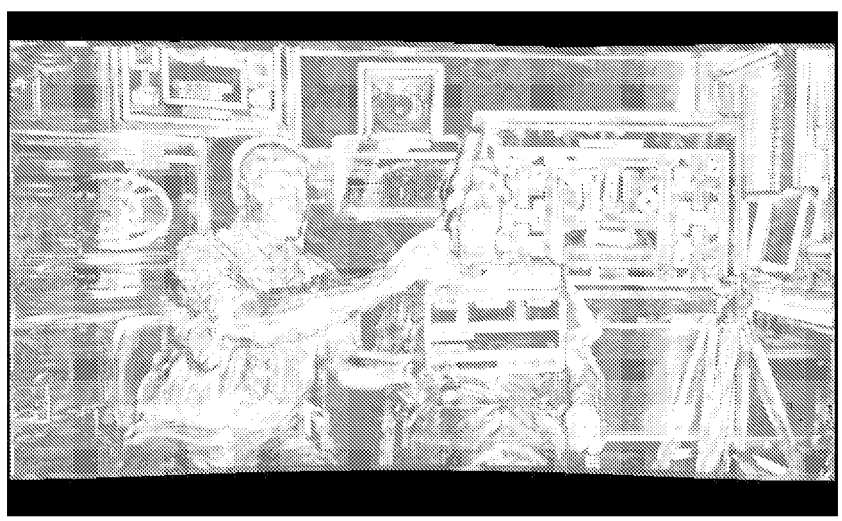
FIG. 4 depicts a map showing a renormalized matching quality.

Therefore, the distribution of the matching quality is preferably flattened similar to a kind of histogram equalization. The result is shown in FIG. 4, where additionally a lower limit was introduced. Pixels having a low matching quality are assigned some minimum confidence as long as they are consistent. Only inconsistent pixels are assigned a confidence of zero.

Figure 5:
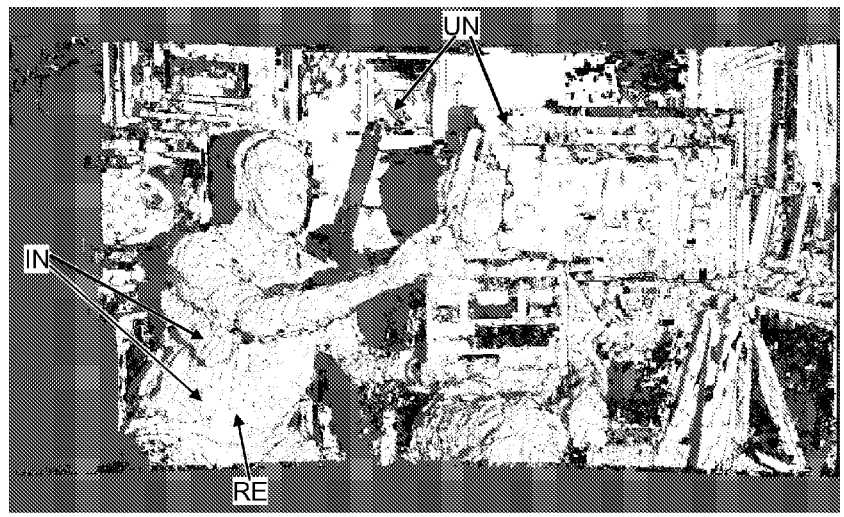
FIG. 5 is a map showing pixels having different confidence classes.

Obviously, there are areas in the left picture (FIG. 1) that are occluded in the right picture (FIG. 2). These areas have a low left-right consistency (DLR) and are indicated by black pixels in the picture of FIG. 5, while the white pixels identify pixels having a high matching consistency (DLR=0).

Even in areas having a good texture there are pixels having a left-right consistency of one (DLR=1). They are typically found to be invisible, see the areas indicated by "IN" in FIG. 5. However, these pixels form thin lines that are typically one pixel wide and their left-right consistency is likely to be violated by sampling issues only. Accordingly, they are also treated as being reliable (comparable to the reliable white pixels, see area indicated by "RE" in FIG. 5).

However, there are a few pixels which have a medium left-right consistency (DLR=1) and are visible. Typically, these pixels form clusters of various sizes which underlines that they cannot be explained by sampling issues and therefore they are treated to be less reliable. The respective areas are indicated by "UN" in FIG. 5. Finally, there are very few pixels for which the stereo matching failed.

The pixels in the confidence map in FIG. 4 are classified in four classes namely RELIABLE, UNRELIABLE, OCCLUDED and UNDECIDED. The classification is also illustrated by the following table:

| left-right consistency | visibility | classification |
|---|---|---|
| 0 | (yes) | RELIABLE |
| 1 | no | RELIABLE |
| 1 | yes | UNDECIDED |

| left-right consistency | visibility | classification |
|---|---|---|
| 2 | yes/no | UNDECIDED |
| ≥3 | yes | UNRELIABLE |
| ≥3 | no | OCCLUDED |

For pixels having a LRC=0, it is assumed that they are also visible.

The aforementioned classes are preferably assigned a confidence value in the interval [0;1], e.g. RELIABLE=1, UNRELIABLE=0 and UNDECIDED=0.5. OCCLUDED pixels are flagged to be treated differently in subsequent stages.

Figure 6:
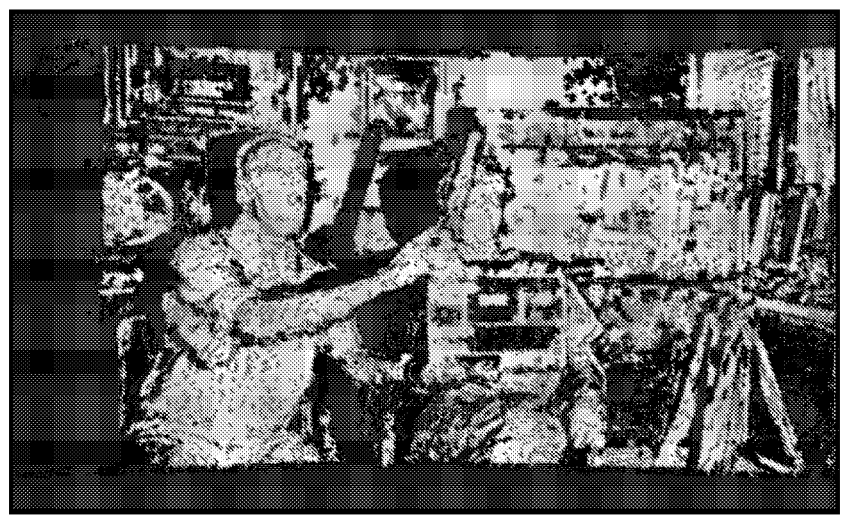
FIG. 6 is a confidence map according to an embodiment of the invention.

Due to the jagged object borders and the probably ill-defined transitions between reliable and unreliable regions, it is advantageous to reduce the confidence not only for the unreliable pixels themselves but also for their surroundings. A reliable pixel is expected to be surrounded by many other reliable pixels is likely to be more reliable than a pixel at the edge of a reliable region. Such neighborhood relationships are further taken into account for determination of a continuous confidence value. The confidence of a pixel is increased proportionally to both the distance to the next UNDECIDED pixel as well as the next UNRELIABLE pixel. The result is shown in FIG. 6. The light pixels indicate pixels having a high confidence while dark pixels indicate pixels having a low confidence.

The underlying disparity map may be further refined in a refinement step using information from the corresponding confidence map.

Figure 7:
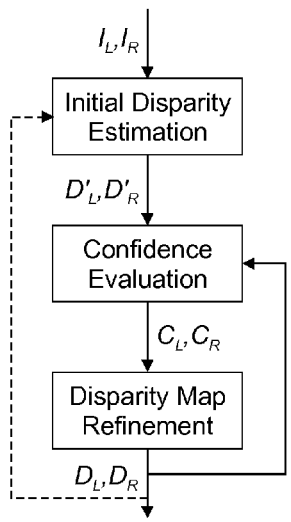
FIG. 7 is a flow-chart illustrating a method for refining a disparity map according to an embodiment of the invention.

FIG. 7 is a flowchart illustrating a basic structure for disparity estimation according to an embodiment of the invention. There are three main stages: Initial disparity estimation, confidence evaluation, and disparity map refinement. Input for the initial disparity estimation is an image pair consisting of a left hand right image $I_L$, $I_R$, e.g. the pictures in FIGS. 1 and 2. The output of the complete disparity estimation process are two refined disparity maps, a left one $D_L$ for the estimation from left to right and a right one $D_R$ for the estimation from right to left, as well as two corresponding confidence maps $C_L$ and $C_R$. The confidence calculation and the disparity map refinement can be an iterative process depending on the required quality and reliability for the final disparity maps. Moreover, there is an optional feedback loop (illustrated by the dashed line) that allows to use refined disparity maps $D'_L$, $D'_R$ as input for the initial disparity estimation for subsequent image input pairs.

Figure 8:
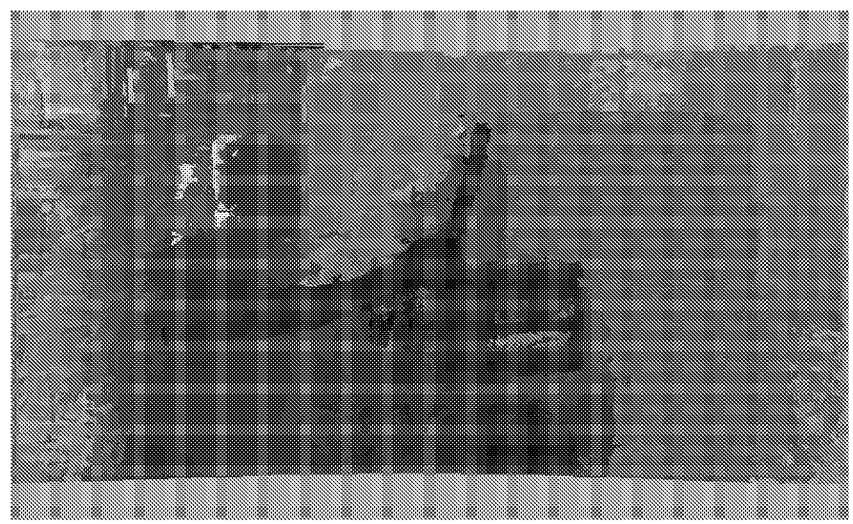
FIG. 8 is a disparity map before refinement.

FIG. 8 is an initial disparity map resulting from the stereo matching from the left view in FIG. 1 to the right view in FIG. 2 that is to be refined by a cross-multilateral filter using the confidence map, e.g. the confidence map in FIG. 6. A refined disparity map is calculated by applying the following formula $$D(p) = \frac{1}{w(p)} \sum_{q \in \Omega} s(\|p - q\|) r(I(q) - I(p)) c(q) D'(q),$$

wherein D(p) is the output, i.e. the refined disparity map, Ω is a surrounding area around the pixel of interest q, s defines a spatial filter kernel, r defines a range filter kernel which preferably are both truncated Gaussian filters. c(q) is the confidence value at the pixel q and D'(q) is the previous value of the disparity map at the position q. w(p) is a normalization factor.

A cross bilateral filter (also known as joint bilateral filter) is a variant of a bilateral filter. However, the Image I is used for the range filter kernel. The confidence filter kernel c evaluates the reliability of the disparity estimates to be smoothed.

Figure 9:
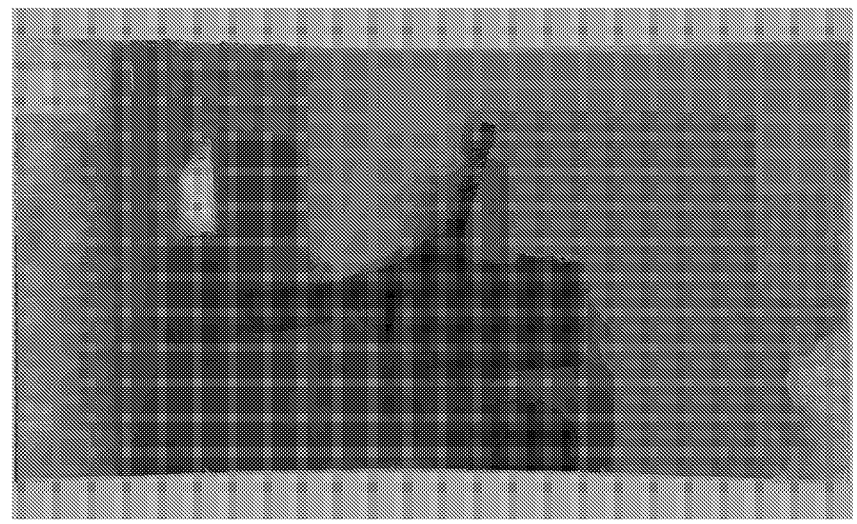
FIG. 9 shows the disparity map of FIG. 8 after refinement.

The performance of the refinement is visible when comparing the disparity maps in FIG. 8 and FIG. 9, which is the result of the refinement after ten iterations. A combination with a confidence map fosters the spreading of reliable estimates while suppressing unreliable estimates. The weighted filtering allows the disparity estimates of the surrounding background to spread into the occluded region while the foreground disparities are blocked by the color intensity difference at the object border. By considering neighborhood relationships to reduce the confidence value for pixels at the edges of reliable regions as described above, the confidence map also helps in preventing the disparity estimates from leaking over object borders. Due to the block matching, foreground objects are normally enlarged in the disparity map. This is due to the fact that background pixels are assigned to the disparity of the foreground object as long as the radiant of the object lies within the matching block. Therefore some disparities will spill over into the background region whereby they would spread if a classical bilateral filter was applied.

Figure 10:
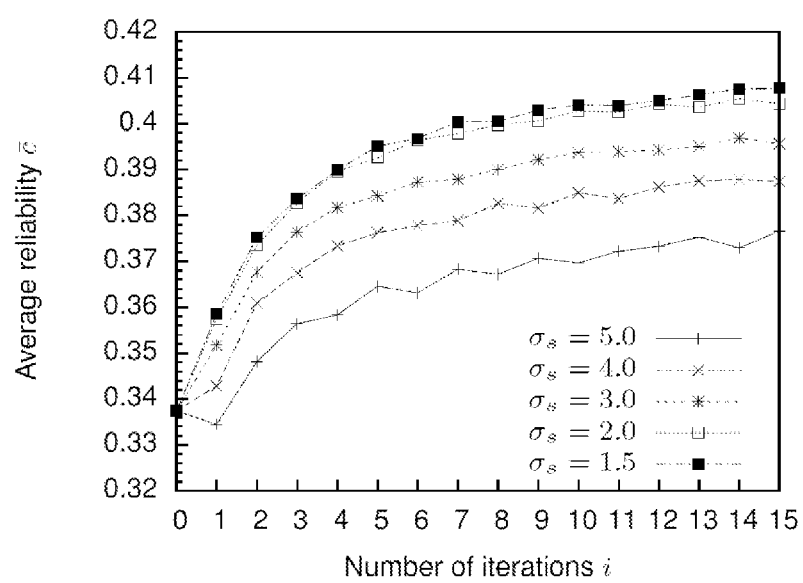
FIG. 10 depicts a graph showing an average reliability over a number of refinement iterations.

FIG. 10 is an average confidence for an increasing number of iterations and various standard deviation $\sigma_s$ of the spatial filter kernel s. The initial value i=0 means no refinement step and represents the result for the initial estimation (FIG. 8). In general, it can be stated that the average reliability of a disparity map as well as the visual quality increases with the number of iterations. Thereby, the average reliability converges against a certain upper bound (see FIG. 10). It is evident that with a higher number of iterations the object edges become sharper and are better aligned to the underlying image. In addition, the objects or especially the background become more planar and smoother, as the discontinuities are removed to a large extent. Even the outliers that caused the over- and underflow in the initial disparity map are almost gone after a few refinement cycles. Even after ten iterations and constant key parameters there is nearly no leakage.

Although the invention has been described hereinabove with reference to a specific embodiment, it is not limited to this embodiment and no doubt further alternatives will occur to the skilled person that lie within the scope of the invention as claimed.

The invention claimed is:

1. A method for generating a confidence map, the method being implemented in a disparity estimation stage comprising a hardware processor configured to:
retrieve a first stereo image and a second stereo image, each having a plurality of pixels;
generate a disparity map from the first stereo image and the second stereo image, the disparity map having a plurality of disparity values;
determine a first confidence value for each disparity value based on a match quality between a pixel or a group of pixels in the first stereo image and a corresponding pixel or a corresponding group of pixels in the second stereo image;
determine a second confidence value for each disparity value based on a consistency of disparity estimates of the pixel or the group of pixels in the first stereo image and the corresponding pixel or the corresponding group of pixels in the second stereo image;
wherein the second confidence value assumes one of at least four discrete values of confidence, the discrete values of confidence being RELIABLE, UNRELIABLE, OCCLUDED and UNDECIDED;

determine a combined confidence value for each disparity value from the first confidence value and the second confidence value; and store the combined confidence value for each disparity value in a confidence map.

2. The method according to claim 1, wherein the consistency is determined by performing a pixel-based left right consistency check.

3. The method according to claim 1, wherein the match quality values are re-normalized.

4. The method according to claim 1, wherein for determination of the second confidence value, information about a visibility of the respective pixel is taken into account.

5. The method according to claim 1, wherein the value of confidence

RELIABLE is assigned to pixels having a left-right consistency of zero or invisible pixels having a left-right consistency of one pixel;

UNRELIABLE is assigned to visible pixels having a left-right consistency greater than a threshold value;

OCCLUDED is assigned to invisible pixels having a left-right consistency greater than the threshold value; and UNDECIDED is assigned to all remaining pixels.

6. The method according to claim 5, wherein the threshold value is two pixels.

7. The method according to claim 1, wherein the combined confidence value is determined by further taking into account information about a confidence value of further pixels that are located in a surrounding area of the respective pixel.

8. The method according to claim 5, wherein a confidence value is determined based on at least one of a distance to the next unreliable/occluded pixel and a distance to the next undecided level.

9. A method for refining a disparity map using a confidence map which is associated to the disparity map, the method being implemented in a disparity map refinement stage comprising a hardware processor configured to:

apply a domain filter kernel on a pixel of interest and a pixel in a surrounding area of the pixel of interest;

apply a range filter kernel on the pixel of interest and the pixel in the surrounding area of the pixel of interest;

determine a product of the result of the domain filter kernel and a result of the range filter kernel;

determine a filtered disparity value for the pixel in the surrounding area of the pixel of interest by multiplying a disparity value from the disparity map for the pixel in the surrounding area of the pixel of interest with the product of the result of the domain filter kernel and the result of the range filter kernel and with a confidence filter kernel for the pixel in the surrounding area of the pixel of interest, wherein the confidence filter kernel is derived from the associated confidence map;

generate a refined disparity value for the pixel of interest by determining a weighted average of the filtered disparity value of the pixels in the surrounding area of the pixel of interest; and store the refined disparity value for each pixel of interest in a refined disparity map.

10. The method according to claim 9, wherein applying the domain filter kernel comprises determining a spatial distance between the pixel in the surrounding area and the pixel of interest, and wherein applying the range filter kernel comprises determining a color or intensity difference between the pixel in the surrounding area and the pixel of interest.

* * * * *